(12) United States Patent
Dorfman et al.

(10) Patent No.: US 8,556,735 B1
(45) Date of Patent: Oct. 15, 2013

(54) UNIVERSAL JOINT

(71) Applicant: Trick Percussion Products, Inc., Arlington Heights, IL (US)

(72) Inventors: Michael Dorfman, Prairie View, IL (US); George Szwaya, Richmond, IL (US)

(73) Assignee: Trick Percussion Products, Inc., Arlington Heights, IL (US)

( * ) Notice: Subject to any disclaimer, the term of this patent is extended or adjusted under 35 U.S.C. 154(b) by 0 days.

(21) Appl. No.: 13/747,196

(22) Filed: Jan. 22, 2013

(51) Int. Cl.
*F16D 3/43* (2006.01)
*G10D 13/02* (2006.01)

(52) U.S. Cl.
USPC .......................... 464/126; 464/136; 84/422.1

(58) Field of Classification Search
USPC ................ 464/125, 126, 128, 130, 136, 905; 84/422.1, 422.2
See application file for complete search history.

(56) References Cited

U.S. PATENT DOCUMENTS

| | | | |
|---|---|---|---|
| 1,273,289 A | | 7/1918 | Urschel |
| 1,887,793 A | | 11/1932 | Williams |
| 2,336,579 A | | 12/1943 | Venditty et al. |
| 3,423,958 A | * | 1/1969 | Koelling ............... 464/126 X |
| 5,574,237 A | | 11/1996 | Yanagisawa |
| 6,137,040 A | | 10/2000 | Hoshino |
| 6,166,312 A | | 12/2000 | Brewster et al. |
| 6,570,076 B1 | | 5/2003 | Kjellgren |
| 6,590,147 B2 | | 7/2003 | Kassabian |
| 6,878,068 B2 | | 4/2005 | Bigelow et al. |
| 6,881,151 B1 | | 4/2005 | Jantz et al. |
| 7,037,202 B2 | * | 5/2006 | Bigelow et al. ........... 464/905 X |
| 7,633,000 B2 | | 12/2009 | Dorfman et al. |
| 2003/0226442 A1 | | 12/2003 | Dennis et al. |
| 2004/0060421 A1 | | 4/2004 | Yun |
| 2004/0144198 A1 | | 7/2004 | Gatzen |
| 2011/0069917 A1 | * | 3/2011 | Yamada et al. |

OTHER PUBLICATIONS

"Bearing Interference Fit." NMB Technologies Corporation. Feb. 1, 2011, [online], [retrieved on Nov. 7, 2013] Retrieved from the Internet <URL:http://web.archive.org/web/20110102013038/http://www.nmbtc.com/bearings/engineering/fitting.html>.*
Stock Drive Products/Sterling Instrument, E-Product Manager website, available at https://sdp-si.com/eStore/, last viewed Sep. 11, 2007.

(Continued)

*Primary Examiner* — Gregory Binda
*Assistant Examiner* — Josh Skroupa
(74) *Attorney, Agent, or Firm* — Beem Patent Law Firm

(57) ABSTRACT

A universal joint includes a spider operatively coupled to two pairs of trunnions, each pair of trunnions having an axis. The spider includes first and second portions that may substantially bisect the spider along a plane containing the axes. The joint further may include a pair of yokes, each yoke having a shaft and a pair of bosses, and each pair of bosses may receive the distal parts of a corresponding pair of trunnions. The spider further may include a plurality of openings, each opening receiving a ball bearing. Each opening in the spider may include a shoulder configured to abut the ball bearing in a radial direction, e.g., by extending radially inward from an outer surface of the spider. The trunnions may be press fit into the bearings and the bosses, and the bearings may be press fit into the spider openings, thereby eliminating backlash in the universal joint.

19 Claims, 3 Drawing Sheets

(56) References Cited

OTHER PUBLICATIONS

Stock Drive Products/Sterling Instrument, Universal Joint Product Finder, p. 7-5, available at http://www.sdp-si.com/D790/HTML2/D790C07004_2.html, last viewed Sep. 11, 2007.

Pearl Drum double pedal, available at http://www.pearldrum.com/p2000-2-bc.htm & http://www.pearldrum.com/p2000-2-bc_lrg.htm, last viewed Sep. 11, 2007.

Yamaha double pedal, available at http://www.yamaha.com/drums/drumproductdetail.html?CNTID=544626&CTID=5040585&AFLG=N, last viewed Sep. 11, 2007.

Belden Universal Joints, Needle Bearing Universal Joints, available at http://www.beldenuniversal.com/pdf/Needle_Bearing_Universal_Joints.pdf, last viewed Sep. 20, 2007.

Image of BELDEN universal joints, received Sep. 14, 2007.

* cited by examiner

UNIVERSAL JOINT

BACKGROUND

1. Field of the Invention

This invention relates to a universal joint for transmitting rotational forces between two members. One potential application for this universal joint is in the field of musical instruments, more specifically, to a drum pedal linkage system, although the joint may be used in myriad other fields.

2. Background of the Invention

Universal joints have multiple uses in applications where rotational forces from a first shaft are transferred to a second shaft.

U.S. Pat. No. 7,633,000 to Dorfman, et al., discloses a universal joint that can be used in several areas and that has particular applicability to a drum pedal linkage, whereby a user seeks to actuate a drum beater by depressing a pedal remotely located from the beater but operatively connected via a rotating linkage. The universal joint in this patent includes a spider formed as a unitary member. The spider is operatively coupled to a plurality of yokes via a plurality of trunnions that are held in place with needle bearings, bushings, etc. While this universal joint features significant anti-backlash advantages over other universal joints, the use of needle bearings may introduce sizing variations that require the manufacture and use of trunnions of multiple sizes, which may increase cost and require longer assembly times.

U.S. Pat. No. 6,878,068 to Bigelow, et al., discloses a multi-piece universal joint that also uses needle bearings. In addition, while Bigelow teaches the use of a multi-piece ring member, it disparages the use of "split rings" as allegedly reducing bearing strength and requiring removal of both shafts in order to install and/or service the joints.

U.S. Pat. No. 2,336,579 to Venditty, et al., discloses a universal joint that similarly relies on the use of needle bearings. It incorporates a cushioning assembly around each bearing, which, while reducing or eliminating a need to seal the bearing, also may allow for lateral displacement of the yoke members and/or the bearings themselves.

U.S. Pat. No. 1,273,289 to Urschel discloses a universal joint that uses bushings, not bearings, to aid in rotational movement. The halves of the ring in the Urschel joint are joined by rivets, which still may permit lateral movement of the yokes, introducing backlash and inefficiency into the joint.

What is needed is a universal joint that overcomes the drawbacks described above.

SUMMARY OF THE INVENTION

In one aspect, a universal joint may include a spider operatively coupled to two pairs of trunnions, each pair of trunnions having an axis. The spider may include first and second portions that may substantially bisect the spider along a plane containing the axes. Each one of the trunnions has a part proximate to the spider and a distal part extending inwardly from the spider. The joint further may include a pair of yokes, each yoke having a shaft and a pair of bosses, and each pair of bosses may receive the distal parts of a corresponding pair of trunnions.

The spider further may include a plurality of openings, each opening receiving a ball bearing. The ball bearings may be one or more of the following: single row bearings, deep groove bearings, and shielded bearings. Each opening may include a shoulder configured to abut the ball bearing in a radial direction, e.g., by extending radially inward from an outer surface of the spider.

Each of the trunnions may be press fit into a respective ball bearing and into a respective opening in the bosses. Similarly, each ball bearing may be press fit into a respective one of the plurality of openings.

In another aspect, a universal joint may include a spider operatively coupled to two pairs of trunnions, each pair of trunnions having an axis. Each one of the trunnions may have a part proximate to the spider and a distal part extending inwardly from the spider. The spider may include first and second portions that may substantially bisect the spider along a plane containing the axes. The spider further may include a plurality of openings, each opening receiving a bearing, and each opening including a shoulder. In addition, the joint may include a pair of yokes, each yoke having a shaft and a pair of bosses, and each pair of bosses may receive the distal parts of a corresponding pair of trunnions. Moreover, a pair of the shoulders may be configured to prevent lateral movement of one of the pairs of bosses.

Each bearing may be a ball bearing, and the ball bearings may be one or more of the following: single row bearings, deep groove bearings, and shielded bearings. The shoulders may be configured to abut respective ball bearings in a radial direction, and each shoulder mar extend radially inward from an outer surface of the spider.

In this aspect, each of the trunnions may be press fit into a respective ball bearing and into a respective opening in the bosses. Similarly, each ball bearing may be press fit into a respective one of the plurality of openings.

These and other features and advantages are evident from the following description of the present invention, with reference to the accompanying drawings.

DETAILED DESCRIPTION OF THE INVENTION

Figure 1:
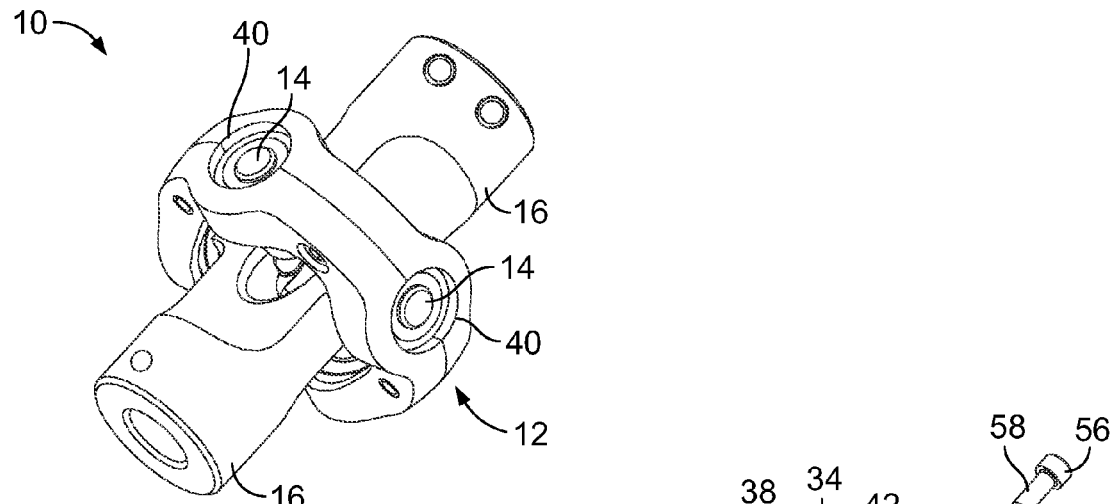
FIG. 1 is a perspective view of one embodiment of a universal joint connecting a pair of yokes.
Figure 2:
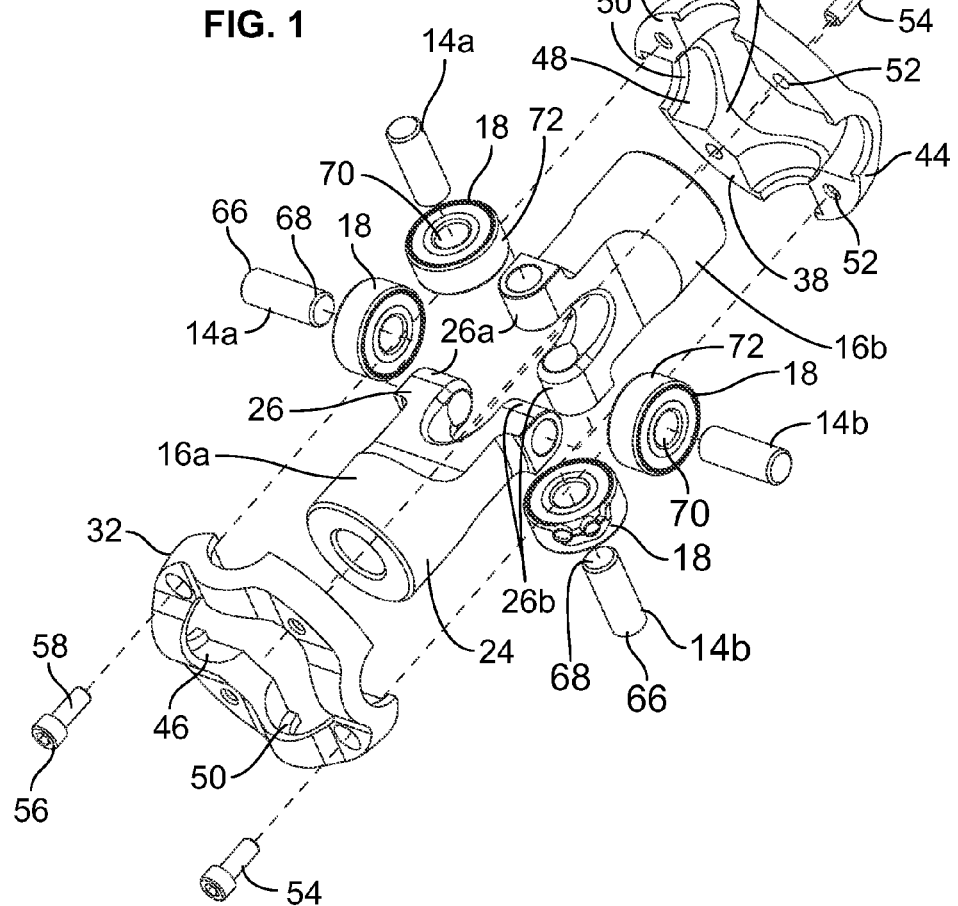
FIG. 2 is an exploded view of the joint of FIG. 1.

As shown generally in FIGS. 1-2, a universal joint 10 may include a spider 12 with a plurality of paired trunnions 14, a plurality of yokes 16, and a plurality of bearings 18.

Each trunnion 14a in a pair may be axially aligned with the other trunnion 14b, such that universal joint 10 may include a pair of axes of rotation 20, 22. Preferably, axes are perpendicular to one another and intersect at a center of universal joint 10, although one axis may be angled with respect to another axis, and one or more of the axes may be offset from the center of the joint.

A plurality of yokes 16 may be generally normally aligned. Each yoke 16 may include a shaft 24 and a pair of bosses 26. Shafts 24 may extend away from the internal opening of spider 12 in generally opposite directions.

Spider or collar 12, trunnions 14, and bearings 18 may be configured so that connectors such as bosses 26 may engage trunnions 14 in the space radially inward from collar 12. Interior space may be sized slightly larger than an outer width of yokes 16 so that a small portion of trunnions or bearings or both may fill a gap between spider 12 and yokes 16. Configuring universal joint 10 so that engagement occurs in the interior space of the spider 12 may reduce the moment of inertia of universal joint 10, which may allow universal joint 10 to rotate more easily and transfer energy from one yoke 16a to another yoke 16b more efficiently.

Each pair of bosses 26 may receive a corresponding one of said pairs of trunnions 14. The trunnions 14 may be any structure that may rotatably connect the bosses 26 to the spider 12. Trunnions 14 may be integral with spider 12 or bosses 26 or, alternatively, may be separate components, e.g., pins, pivots, rods, shafts, posts, or balls. As seen in FIG. 2, for each yoke, a pair of trunnions 14 may be provided in the form of a pair of pins. Alternatively, a pair of trunnions 14 may be provided in the form of spaced regions of a single pin. Pins or trunnions 14 may be made of any suitable material, but they preferably are made from heat-treated stainless steel.

If trunnions 14 are pairs of pins, they may be spaced from each other at a point between arms of bosses 26. In one embodiment, inner ends of trunnions 14 may be spaced between about 0 inches and about ⅜ inch, preferably between about ⅛ inch and about ⅜ inch, still more preferably between about ¼ inch and about ⅜ inch. Trunnions 14 also may be coated with a lubricating substance that may reduce friction in the event a trunnion operatively connected to one yoke contacts a trunnion operatively connected to second yoke. If used, lubricating substance, however, preferably coats distal part 68 of trunnion and does not substantially overlie proximal portion 66 of trunnions in contact with bearings (discussed below).

The size of the trunnions 14 may vary, e.g., depending upon the application for which universal joint 10 is used. In one embodiment, each trunnion 14 is generally cylindrical and has a length between about ¼ inch and about ¾ inch, preferably about ½ inch, with a diameter between about 0.1 inch and 0.3 inch, and preferably 3/16 inch.

Each yoke 16 may be rotatably attached to the spider 12 so that each yoke 16a, 16b may rotate about a corresponding axis 20, 22 of rotation. For example, in the embodiment shown in FIG. 1, each yoke engages a pair of trunnions or pins and is rotatable about the axis of rotation of the pair of pins. While the size and the shape of each yoke 16 may vary, each yoke preferably has a pair of bosses 26, or arms, for engaging the proximal parts 66 of the trunnions 14. The shape of the bosses 26 may vary, but preferably each pair of bosses 26 is generally U-shaped, creating a void between arms of one boss 26 that allows yoke 16a to rotate to a point proximate spider 12 generally without contacting other yoke 16b, and vice-versa. Each arm 26a, 26b may have an arm hole for engaging a respective trunnion 14a, 14b that aligns along the respective axis so that the first yoke 16a is rotatable about the first axis 20 and second yoke 16b is rotatable about the second axis 22.

The dimensions of yokes 16a, 16b shown in FIGS. 1-2 may vary, but in one embodiment, each yoke may have an overall length of between about 1 inch and about 2 inches. In that embodiment, each arm or boss 26 may have a length of between about ⅛ inch and about ⅜ inch, preferably about ¼ inch. In that embodiment, the distance between the arms of each yoke may be between about ¼ inch and about ½ inch, preferably about ⅜ inch. The yokes 16a, 16b may be made of any suitable material, but preferably they are made from aluminum.

Yokes 16 may fit within small tolerances with respect to the spider 12. Tolerances may be selected to allow generally free rotation between yokes 16 and spider 12 but may be tight enough to prevent substantial lateral movement of the yokes 16 with respect to the spider 12. In one embodiment, the clearance between yoke and spider may be between about 0 inches and about ⅛ inch, preferably between about 1/32 and about 3/32 inch.

In the exploded view shown in FIG. 2, spider 12 is ring-shaped and has a radially interior space 32 in which trunnions 14 and bosses 26 are disposed. Spider may have alternative shapes, e.g., rectangular, oblong, octagonal, etc.

Spider 12 may be formed of a plurality of elements coupled together. As seen in FIG. 2, a first portion 32 and second portion 34 may be operatively coupled to form spider 12. First portion 32 and second portion 34 may be substantially identical to one another, which may simplify manufacturing and assembly of universal joint 10.

Figure 4:
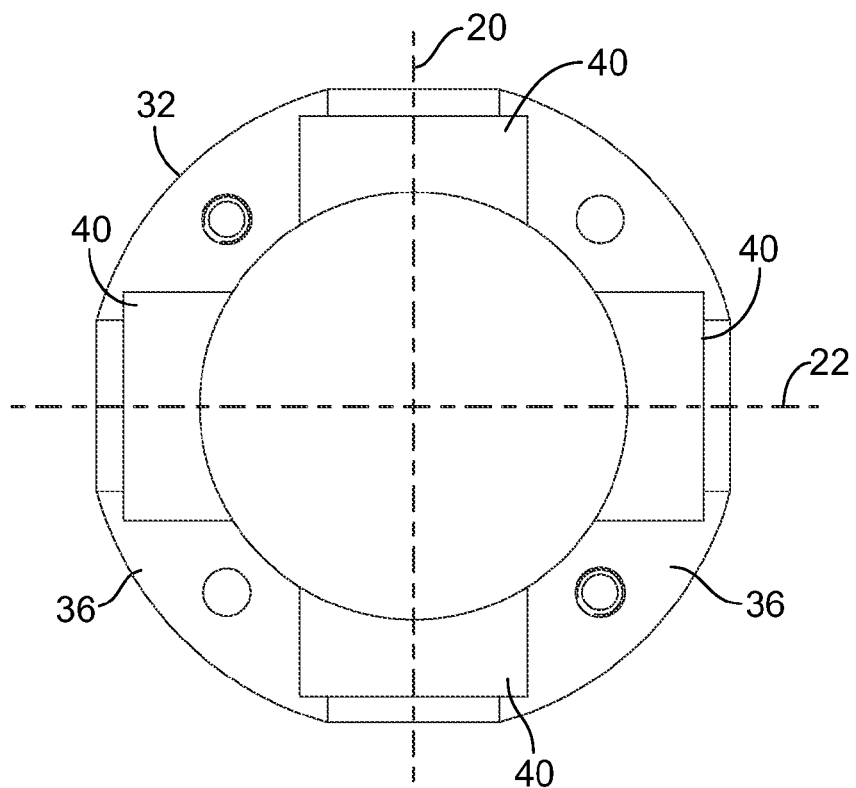
FIG. 4 is a bottom view of the portion of FIG. 3.

Both spider 12, generally, and first and second portions 32, 34, specifically, may be substantially symmetrical about the planes normal to one of and passing through the other of axes 20, 22, as seen in FIG. 4. First portion 32 may include a first plurality of surfaces 36, and second portion 34 may include a second plurality of surfaces 38, where surfaces 36 and 38 are configured to interface with one another when portions 32, 34 are coupled together. Alternatively, surfaces 36, 38 may be marginally spaced from and parallel to one another, e.g., by a distance of between about 1/64" and about ⅛", preferably between about 1/64" and about 1/16", and in one embodiment, about 1/32". In the embodiment of FIGS. 1-2, surfaces 36, 38 generally bisect spider, i.e., they generally lie in the plane containing axes 20, 22. Alternatively, one or more set of interfacing surfaces may lie outside that plane, e.g., circumferentially alternating pairs of surfaces may lie on alternating sides of the plane.

Spider 12 may include a plurality of openings 52 configured to receive a plurality of fasteners 54 to separably couple first portion 32 to second portion 34 and to retain trunnions 14 and bearings 18 between first portion 32 and second portion 34. Openings may be disposed on and through surfaces 36, 38, and each surface 36, 38 preferably includes at least one opening 52.

Figure 3:
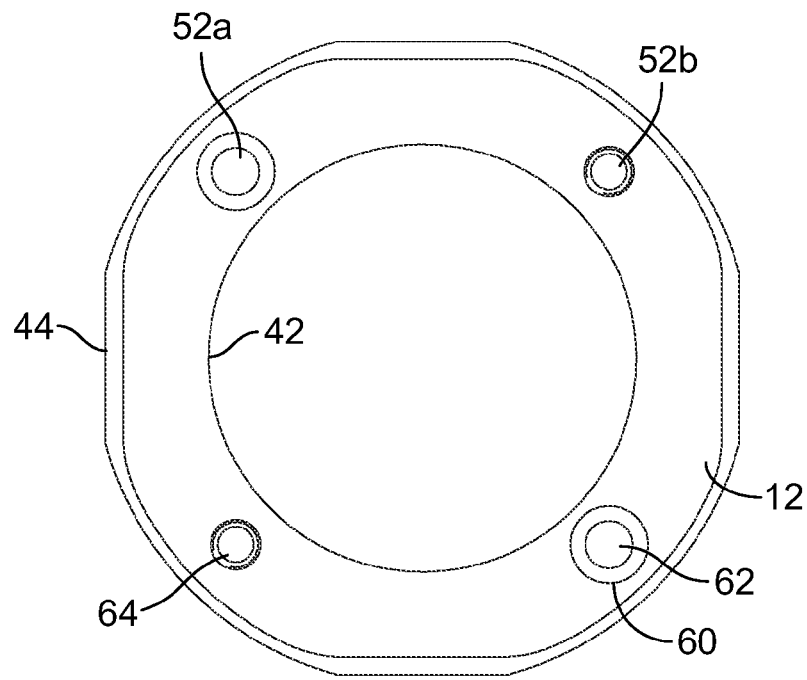
FIG. 3 is a top view of one portion of a spider used in the universal joint of FIG. 1.

Spider 12 may include at least two types of openings 52a, 52b, as seen in FIGS. 3-4. A first opening 52a may be configured to receive a head 56 and a portion of shank 58 of fastener 54, and a second opening 52b may be configured to receive the rest of shank 58 of fastener. When first portion 32 is joined with second portion 34, first opening 52a is disposed substantially collinear with second opening 52b, so that openings 52a, 52b cooperate to receive fastener 54. In addition, openings 52a, 52b may be substantially perpendicular to surfaces 36, 38 and/or substantially perpendicular to plane bisecting spider 12 into first and second portions 32, 34.

First opening 52a may include a first recess 60 configured to receive fastener head 56. Preferably, first recess 60 is sized such that head is recessed or sits substantially flush with outer surface of spider 12 when fastener is inserted fully. First opening 52a then may taper or step down to second, smaller recess 62.

Second opening 52b may include recess 64 configured to receive fastener shank 58. Preferably recess 64 has a constant diameter along its length, and recess may include threading configured to interface with fastener threading.

Preferably, each portion 32, 34 of spider 12 may include alternating openings, such that fasteners 54 in circumferentially adjacent openings may be driven in opposite directions from one another, which may aid in joining portions 32, 34 securely and evenly.

Fasteners may include torque transmitting surfaces to allow for coupling and uncoupling of spider portions 32, 34. In one embodiment, fasteners may be driven with a 5/64" Allen wrench.

Alternatively, fasteners may permanently couple portions 32, 34 together. For example, fasteners may comprise rivets. In this case, openings 52 may be substantially similar throughout spider, since there may be no need for threading or a recess to receive the fastener head.

Returning to FIG. 2, spider 12 may include a plurality of openings 40 circumferentially disposed between pairs of surfaces 36, 38, preferably equally spaced. Openings 40 may extend outwardly from a radially inner surface 42, preferably to a radially outer surface 44. Spider 12 includes at least as many openings 40 as trunnions 14.

Openings may be spaced and sized to receive trunnions 14 and bearings 18, e.g., each opening may correspond to a generally diametrically opposed opening on the other side of spider 12. In addition, each opening may have another opening offset about 90 degrees on each side of it, although offset openings may not be adjacent if spider contains more than four openings. The universal joint 10 shown in FIGS. 1-4 includes four openings, each opening circumferentially spaced about 90 degrees from an adjacent opening.

Each opening 40 may be formed partially in first portion 32 and second portion 34, such that opening 40 may comprise a first surface 46 and second surface 48. First surface 46 and second surface 48 may be shaped to mate with outer bearing housing or, alternatively, to prevent movement of outer bearing race relative to spider 12. As seen in FIG. 2, surfaces 46, 48 may be portions of a cylinder, although other shapes that achieve these functions are permissible. In one embodiment, surfaces 46, 48 may be generally semi-cylindrical, preferably with a circumferential extent between about 170 degrees and about 180 degrees, more preferably less than semi-cylindrical, and more preferably between about 170 degrees and about 179 degrees.

Opening 40 may include at least one shoulder 50 configured to restrict lateral/radial movement of trunnion 14 and bearing 18. Preferably, the pair of openings configured to receive bearings 18 coupled to trunnions 14 of one yoke 16 each includes at least one shoulder 50, so as to restrict radial movement of both trunnions and bearings. In the embodiment of FIG. 2, shoulders 50 extend inward from radially outer surface 44, although shoulders alternatively or additionally could extend internally from radially inner surface 42.

Each shoulder 50 may have a height extending upward from surfaces 46, 48, e.g., by at least about 1/16". Preferably, shoulder is tall enough to hold bearing 18 securely while not so tall as to obscure trunnion 14 or to contact trunnion, which may increase frictional forces generated by rotating trunnion. Each shoulder 50 preferably also may be about 1/16" thick when measured in a radial direction.

The dimensions of a ring-shaped spider 12 may vary, e.g., depending on the purpose for which universal joint 10 is used. For example, when used as part of a drum pedal linkage, spider 12 may have an outer diameter of between about 1 inch and about 2 inches, preferably between about 1 1/4 inches and about 1 3/4 inches, and in one embodiment about 1 7/16 inches. Spider 12 also may have an inner diameter of between about 1/2 inches and about 1 1/2 inches, preferably between about 3/4 inches and about 1 1/4 inches, and in one embodiment, about 15/16 inches. Spider 12 also may have a thickness between about 1/4 inch and about 1 inch. Thickness may vary along the circumference of spider 12, with thickest portions at openings 40 and thinnest portions therebetween, i.e., generally circumferentially aligned with interfacing surfaces 36, 38, as seen in FIG. 1. Thickness of spider 12 circumferentially aligned with interfacing surfaces may be about the same as diameter of openings 40. Spider 12 may be made of any suitable material, but it is preferably made of metal such as steel or aluminum.

To enhance the ability of trunnions 14 to rotate, openings 40 may be fitted with bushings or, preferably, with bearings 18. As with the trunnions 14, universal joint 10 may include a plurality of pairs of bearings, each pair of bearings aligned along an axis. Preferably, the axes of the pairs of bearings are generally coplanar with one another and are generally coincident with their respective axes of rotation 20, 22.

While bearings 18 may be secured in openings 40 in a variety of ways, it is preferred that bearings 18 are secured by press fitting into openings 40, with at least a portion of outer surface 72 of bearings against shoulders 50, and then clamping between portions 32, 34 of spider 12.

Bearings 18 preferably are radial ball bearings. Unlike needle bearings, ball bearings may be significantly more consistent and precise with regard to an inner diameter of the inner race. As such, whereas a universal joint made with needle bearings may require the manufacture and use of multiple sizes of trunnions to account for bearing variations, universal joint 10 may need only a single size of trunnions 14, contributing to easier, faster, and less expensive manufacture and assembly of universal joint 10.

Bearings 18 may be single row bearings. Bearings 18 also may be deep groove bearings. Bearings 18 further may be shielded bearings. In one embodiment, bearings 18 may be a standard roller bearing such as a 77R3 bearing.

Each bearing 18 may be configured to receive proximal part 66 of a corresponding trunnion 14. Trunnions 14 may be designed to have a specific, predetermined clearance with bearings 18. Preferably, however, in order to enhance the anti-backlash feature of the universal joint 10, trunnions 14 may be sized so as to produce an interference or press fit with bearings 18.

For example, proximal parts 66 of trunnions 14 may be sized slightly larger than a radially interior surface of bearings 18. If trunnions 14 are generally cylindrical and interior surface 70 of bearings 18 is generally cylindrical, this may be accomplished by making the diameter of proximal parts 66 of trunnions 14 slightly larger than the diameter of interior surfaces 70 of bearings 18.

While trunnions 14 preferably are substantially cylindrical, portions or all of trunnions 14 may take other shapes, provided trunnions can be press fit into one or both of bosses 26 and inner surfaces 70 of bearings 18. For example, distal part 68 of trunnion 14 and opening in boss 26 may be rectangular, with trunnion sized slightly larger than boss opening. In another example, distal part 68 of trunnion 14 may be substantially cylindrical while opening in boss 26 may be rectangular, with a diameter of the trunnion being slightly larger than a width across the boss opening.

An interference fit between trunnions 14 and bosses 26 of yokes 16 or, separately, between trunnions 14 and bearings 18, may be particularly useful when yokes 16 are designed to pivot at small angles and move at low speeds. In one embodiment, interference fit between each set of components may be between about 0 inches and about 4/10,000 inches, preferably between about 0 inches and about 3/10,000 inches, still more preferably between about 1/10,000 inches and about 3/10,000 inches.

Drum Pedal Assembly

Figure 5:
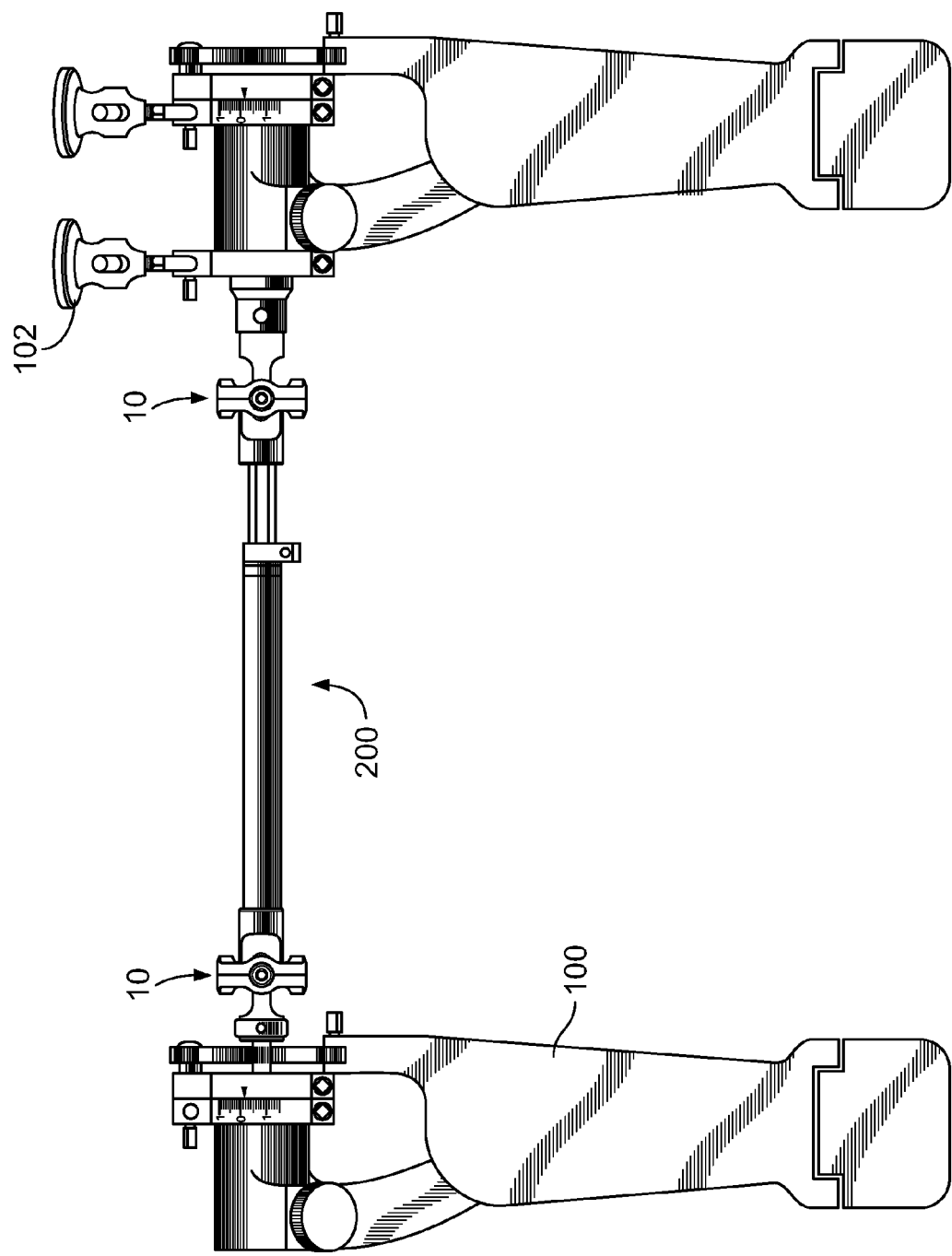
FIG. 5 is a perspective view of one embodiment of a double-drum pedal assembly including two universal joints.

In another aspect, and as seen in FIG. 5, a drum pedal 100 may be connected to a linkage 200 to remotely actuate a beater 102. Details of one example of a linkage and a drum pedal assembly configured for use with one or more universal joints 10 may be found in U.S. Pat. No. 7,633,000, titled U-Joint for Double Pedal, issued Dec. 15, 2009, the contents of which are incorporated by reference, substituting the universal joint described in that patent for the one described herein.

Method of Assembly

Due to substantial symmetry of first and second portions 32, 34 of spider and consistency in sizing of bearings 18, which allows for a single size of trunnions 14 to be used, assembly of universal joint 10 may be quickly and efficiently accomplished.

In one embodiment, a first yoke 16a may be placed in jig with a bearing 18 on each side of boss 26, and a trunnion 14 may be placed on opposite side of each bearing from yoke 16a. Jig may have channels of varying depth that are configured to receive each of trunnions 14, bearings 18 and yoke 16a, respectively. Depths of channels may be configured such that each trunnion 14 may align with its respective opening in bearing 18 and boss 26.

Yoke 16a may be placed substantially "vertical," i.e., with bosses 26 above shaft 24. Alternatively, yoke 16 may be placed substantially "horizontally," i.e., with bosses 26 generally level with shaft 24. This latter orientation may be preferred, because it may provide increased surface area between shaft and bosses to which a cover may be configured to engage yoke 16a and prevent yoke 16a from moving during assembly. In yet another alternative, yoke 16a may be neither "vertical" nor "horizontal" but instead may be disposed at some other angle between "vertical" and "inverted."

Jig further may include a plurality of push rods, each rod aligned with a respective trunnion, bearing, and boss. Once components are loaded into jig and after cover, if present, is deployed, push rods may be activated to press trunnions into bearings and then into bosses. Push rods may operate substantially simultaneously, e.g., via mechanical linkage or electronic control system, in order to push opposing trunnions at the same time and at the same rate.

This process then may be repeated for second yoke 16b, either in the same or a different jig. For example, yokes 16a, 16b may be sized and shaped differently from one another, necessitating a different jig for each yoke in order to maintain proper alignment between trunnions, bearings, and bosses on yokes.

Once each yoke subassembly is formed, each subassembly may be inserted into a respective portion 32, 34 of spider 12. Although bearings 18 preferably are press fit into portions 32, 34, interference fit may not be so large as to prohibit doing so manually. Alternatively, spider portion 32, 34 may be placed into a jig that inhibits rotational movement of the portion. The jig may include a first channel sized to receive the spider portion and a second, radially interior channel having a greater depth that is sized to eventually receive yoke subassembly.

After spider portion is inserted into the first channel and a respective yoke subassembly is lowered into interior of portion 32, 34, a pusher may push down onto yoke subassembly until interference fit is achieved between spider portion and each bearing 18. Preferably, pusher may be configured to contact yoke and not bearings, although pusher additionally or alternatively may contact bearings in order to achieve press fit. Alternatively, a puller may grasp shaft 24 of yoke 16 and then pull bearings 18 into place, relative to spider portion, forming spider subassemblies.

Once spider subassemblies are formed, a first spider assembly may be placed in a jig that inhibits rotational movement of that subassembly. Alternatively, it may remain in the same jig used to form that subassembly. Second spider subassembly then may placed in a position overlying the first spider subassembly such that bearings in the first spider subassembly align with available opening surfaces on the second spider subassembly and vice versa. In one embodiment, for example, yoke subassembly of first spider subassembly may be rotated about 90 degrees with respect to yoke subassembly of second spider subassembly.

A cover portion then may be placed, e.g., rotated, into position over spider portions 32, 34. Cover portion may include a central opening configured to permit unimpeded movement relative to yoke subassembly. Cover portion also may include surface variations configured to accommodate variations in exterior surface of spider portion 34. For example, cover portion may include protrusions configured to be received against lands between openings 40 in spider.

Cover portion then may be closed, compressing spider subassemblies together and creating press fit between spider portion of one subassembly and bearings of the other subassembly.

Cover portion additionally may include a plurality of openings. Openings may extend through protrusions and be aligned with openings 52 in spider portions, thereby facilitating driving of fasteners through cover portion and into spider. Jig may include similar openings, thereby permitting driving of fasteners in both directions into spider, as discussed above. Alternatively, every other fastener may be driven into spider assembly, followed by removing and flipping the assembly, and then driving fasteners into remaining fastener openings 52.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

We claim:

1. A universal joint comprising:
   a spider operatively coupled to two pairs of trunnions, each pair of trunnions having an axis;
   said spider comprising a first portion and a second portion, said first and second portions substantially bisecting said spider along a plane containing said axes;
   said spider further including a plurality of openings, each opening receiving a ball bearing;
   wherein each one of said trunnions has a part proximate to said spider and a distal part extending inwardly from said spider;
   a pair of yokes, each yoke having a shaft and a pair of bosses;
   wherein each pair of bosses receives said distal parts of a corresponding pair of trunnions;
   and wherein each opening is configured to permit insertion of a respective trunnion through the opening and into a respective boss.

2. A universal joint according to claim 1, wherein said ball bearings are single row bearings.

3. A universal joint according to claim 1, wherein said ball bearings are deep groove bearings.

4. A universal joint according to claim 1, wherein said ball bearings are shielded bearings.

5. A universal joint according to claim 1, wherein each opening in said plurality of openings includes a shoulder configured to abut said ball bearing in a radial direction.

6. A universal joint according to claim 5, wherein said shoulder extends radially inward from an outer surface of said spider.

7. A universal joint according to claim 1, wherein each of said trunnions is press fit into a respective ball bearing.

8. A universal joint according to claim 1, wherein each of said trunnions is press fit into a respective opening in said bosses.

9. A universal joint according to claim 1, wherein each ball bearing is press fit into a respective one of said plurality of openings.

10. A universal joint comprising:
    a spider operatively coupled to two pairs of trunnions, each pair of trunnions having an axis;
    said spider comprising a first portion and a second portion, said first and second portions substantially bisecting said spider along a plane containing said axes;
    said spider further including a plurality of openings, each opening having a surface receiving a bearing, the surface extending from a radially inner surface of the spider outward to a shoulder proximate a radially outer surface of the spider;
    wherein each one of said trunnions has a part proximate to said spider and a distal part extending inwardly from said spider;
    a pair of yokes, each yoke having a shaft and a pair of bosses;
    wherein said trunnions extend from said bosses at said distal parts of said trunnions; and
    wherein a pair of said shoulders are configured to prevent lateral movement of one of said pairs of bosses.

11. A universal joint according to claim 10, where each bearing is ball bearing.

12. A universal joint according to claim 11, wherein said ball bearings are single row bearings.

13. A universal joint according to claim 11, wherein said ball bearings are deep groove bearings.

14. A universal joint according to claim 11, wherein said ball bearings are shielded bearings.

15. A universal joint according to claim 11, wherein said pair of shoulders are configured to abut respective ball bearings in a radial direction.

16. A universal joint according to claim 11, wherein each of said shoulders extends radially inward from an outer surface of said spider.

17. A universal joint according to claim 11, wherein each of said trunnions is press fit into a respective ball bearing.

18. A universal joint according to claim 11, wherein each of said trunnions is press fit into a respective opening in said bosses.

19. A universal joint according to claim 11, wherein each ball bearing is press fit into a respective one of said plurality of openings.

* * * * *